(12) United States Patent
Liu

(10) Patent No.: US 11,927,813 B2
(45) Date of Patent: *Mar. 12, 2024

(54) OPTICAL CONNECTOR AND OPTICAL CONNECTOR MODULE AND OPERATION METHOD USING THE SAME

(71) Applicant: Mei-Miao Liu, Taipei (TW)

(72) Inventor: Mei-Miao Liu, Taipei (TW)

(73) Assignee: Mei-Miao Liu, Taipei (TW)

(*) Notice: Subject to any disclaimer, the term of this patent is extended or adjusted under 35 U.S.C. 154(b) by 39 days.

This patent is subject to a terminal disclaimer.

(21) Appl. No.: 17/118,636

(22) Filed: Dec. 11, 2020

(65) Prior Publication Data

US 2022/0075128 A1    Mar. 10, 2022

Related U.S. Application Data

(60) Provisional application No. 63/075,322, filed on Sep. 8, 2020.

(51) Int. Cl.
*G02B 6/36* (2006.01)
*G02B 6/38* (2006.01)

(52) U.S. Cl.
CPC ......... *G02B 6/3897* (2013.01); *G02B 6/3887* (2013.01)

(58) Field of Classification Search
CPC .. G02B 6/3897; G02B 6/3887; G02B 6/3825; G02B 6/3878; G02B 6/36
See application file for complete search history.

(56) References Cited

U.S. PATENT DOCUMENTS

| 2008/0279510 | A1* | 11/2008 | Chan ..................... | G02B 6/4292 385/89 |
| 2011/0129188 | A1* | 6/2011 | Shimotsu ............... | H01R 12/88 385/75 |
| 2011/0275236 | A1* | 11/2011 | Zhu ....................... | G02B 6/4292 439/352 |
| 2016/0252691 | A1* | 9/2016 | Arekar ................. | G02B 6/4261 385/92 |
| 2020/0209487 | A1* | 7/2020 | Takano .................. | G02B 6/387 |
| 2020/0333537 | A1* | 10/2020 | Gniadek .............. | G02B 6/3893 |

FOREIGN PATENT DOCUMENTS

JP          2004212586 A    *    7/2004    ........... G02B 6/3825

* cited by examiner

*Primary Examiner* — Jennifer Doan

(57) ABSTRACT

The present invention provides an optical connector coupled to an optical receptacle, wherein the optical connector comprises an outer housing, a coupling module, and a latch structure. The coupling module is arranged in the outer housing for slidably connecting to the outer housing. When the latch structure is rotated to a first position, the optical connector is unable to be released from the optical receptacle; and when the latch structure is rotated to a second position, the outer housing is allowed to slide relative to coupling module whereby the optical connector is released from the optical receptacle. In one alternative embodiment, the present invention further provides an optical module and an operation method for locking the optical connector into the optical receptacle, or releasing the optical connector from the optical receptacle.

11 Claims, 12 Drawing Sheets

OPTICAL CONNECTOR AND OPTICAL CONNECTOR MODULE AND OPERATION METHOD USING THE SAME

CROSS-REFERENCE TO RELATED APPLICATION

This application claims the benefit under 35 U.S.C. § 119(e) to the U.S. provisional patent application having the Ser. No. 63/075,322 filed on Sep. 8, 2020, the entirety of which is incorporated herein by reference.

FIELD OF INVENTION

The present invention relates to an optical connector, in particular to an optical connector that is locked in or taken away from an optical receptacle by a rotating mechanism as well as an optical connector module and operation method using the same.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

In the optical module, in addition to the structure of the receptacle, the design of the optical connector is also very important. There are many types of optical connectors, and different manufacturers have different designs, such as SN connectors, MDC connectors, or LC connectors. When the connector is to be connected to the receptacle, sometimes the polarity of the connection needs to be changed to adapt to different situations.

However, in the conventional technology, although the optical connector can be coupled to the optical receptacle, how to ensure that the optical connector can be firmly coupled to the optical receptacle without being taken away from the optical receptacle by an external force accidently. It is a problem to be solved in this technical field.

The above information disclosed in this section is only for enhancement of understanding of the background of the described technology and therefore it may contain information that does not form the prior art that is already known to a person of ordinary skill in the art.

SUMMARY OF THE INVENTION

The present invention provides an optical connector with a latch structure that can be positioned at different positions, and the unlocking or locking state of the optical connector and the optical receptacle can be changed according to the position of the latch structure. The advantage of the present invention is to prevent the optical connector from falling off due to an external force or the user's carelessness, and achieve the effect of fixing the optical connector.

The present invention provides an optical connector module. When the optical connector is inserted into the optical receptacle, the latch structure disposed on the optical connector is used to prevent the optical connector from being accidentally pulled out due to an external force. When the latch structure slides to the first position, the optical connector cannot be pulled out from the optical receptacle, and when the latch structure slides to the second position, the optical connector can be taken away from the optical receptacle. The position of the latch structure is changed to stabilize the coupling relationship between the optical connector and the optical receptacle.

In one embodiment, the present invention provides an optical connector module, comprising: an optical receptacle, having a claw member; and an optical connector, coupled to the optical receptacle, and buckled with the claw member, the optical connector including an outer housing, a coupling module, and a latch structure, a unbuckle portion of the outer housing located in the claw member, the coupling module slidably connected to the outer housing, and the claw member buckled on the coupling module, wherein a position the latch structure is changed by a rotating movement to allow the optical connector to lock in the optical receptacle or to be taken away from the optical receptacle by an external force.

In another embodiment, the present invention also provides an operation method of an optical connector module, comprising: providing an optical connector, including an outer housing, a coupling module, and a latch structure; inserting an optical connector into an optical receptacle to make a claw member, which is disposed in the optical receptacle, buckle with the coupling module of the optical connector; moving the latch structure to a first position by a first rotating movement to make the optical connector not taken away from the optical receptacle; and moving the latch structure to a second position by a second rotating movement, sliding the outer housing relative to the coupling module under an external force to make a unbuckle portion of the outer housing move with the external force, thereby releasing the claw member from the coupling module and taking the optical connector away from the optical receptacle.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1A:
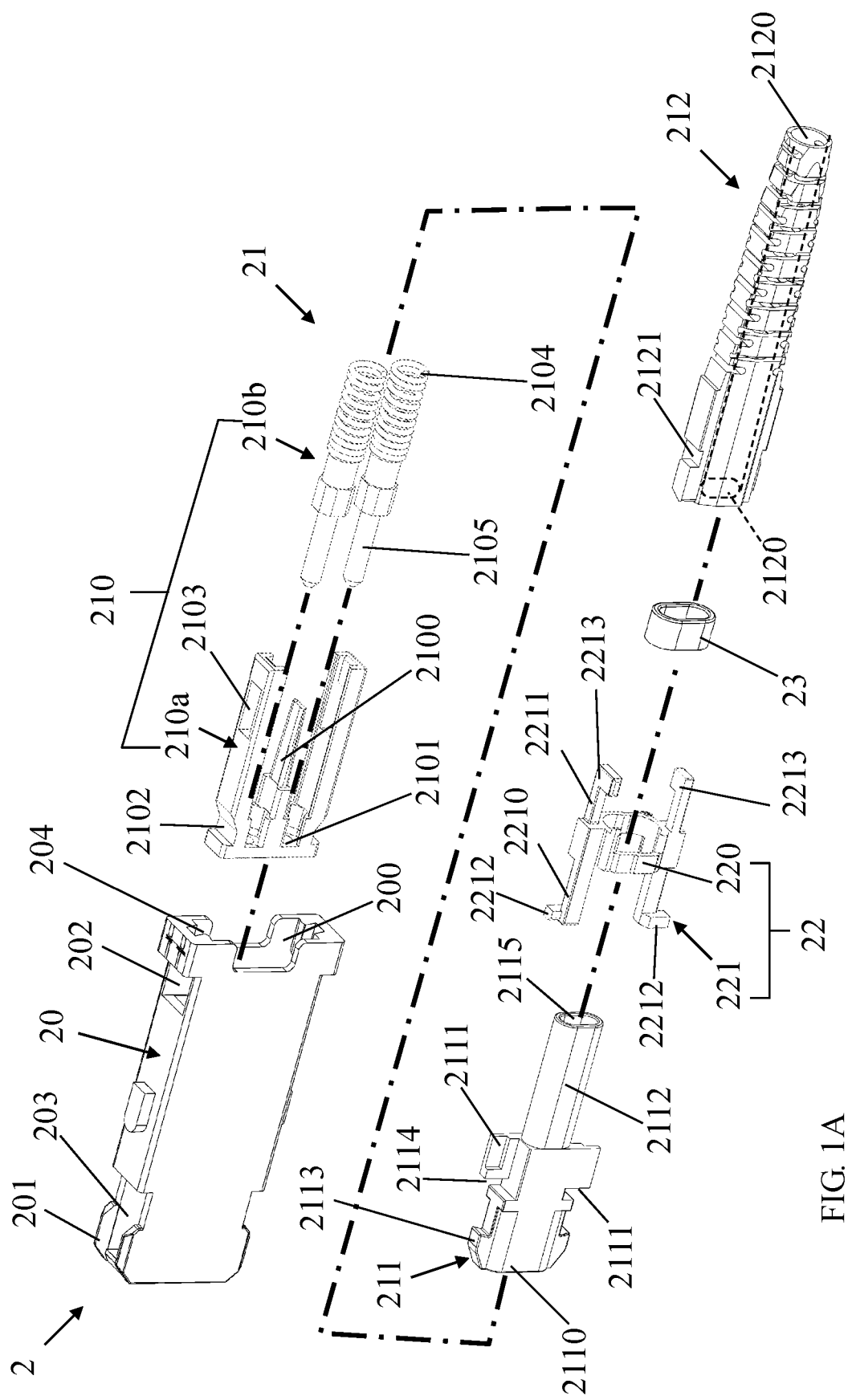
FIG. 1A is a three-dimensional exploded schematic diagram of the optical connector in the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate an optical connector, an optical connector module and operation method using the same and to aid it of skilled in the art in practicing this invention. These embodiments are merely exemplary embodiments and in no way to be considered to limit the scope of the invention in any manner.

Figure 1B:
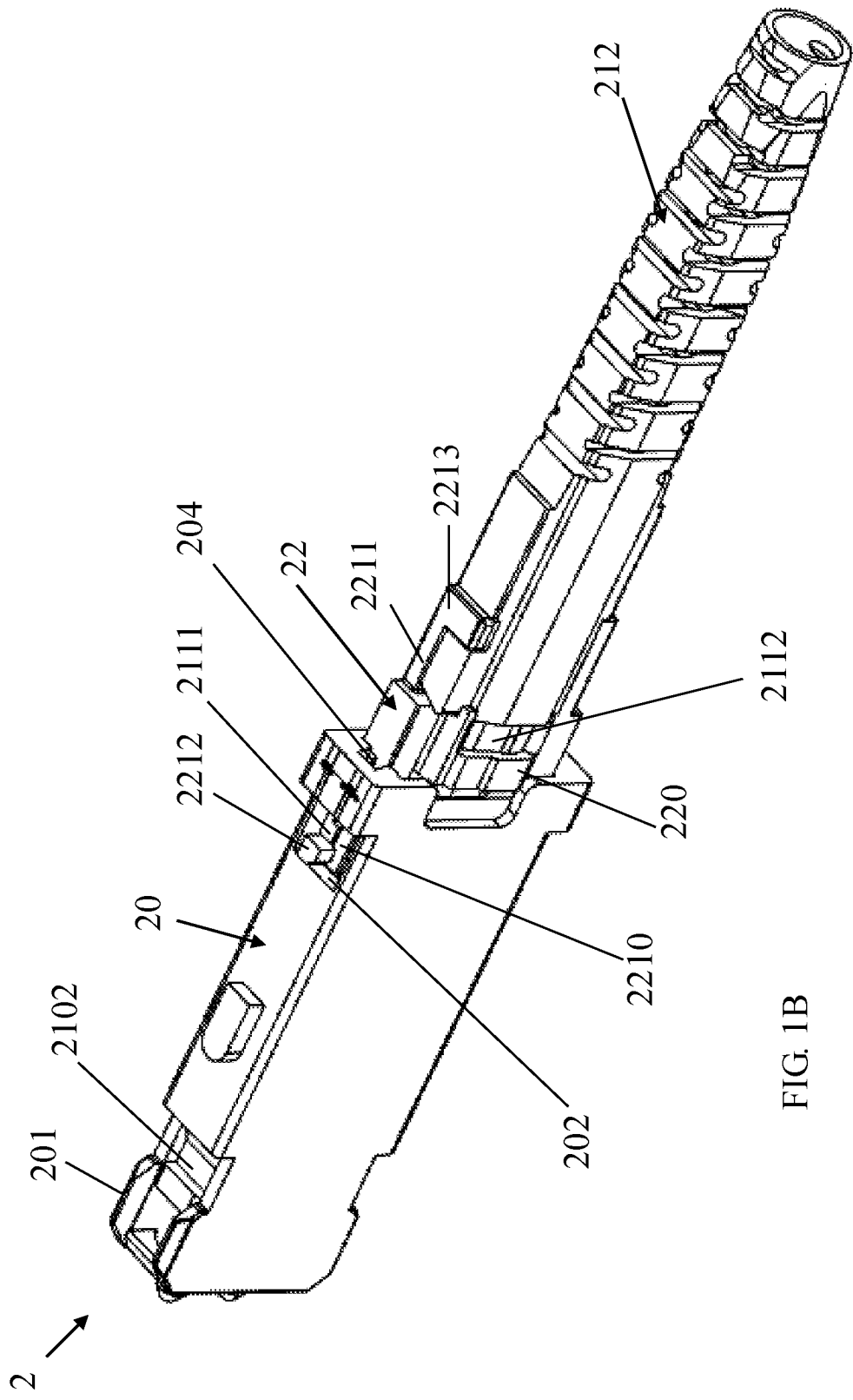
FIG. 1B is a schematic diagram of the optical connector assembly in the present invention.

Please refer to FIGS. 1A and 1B, FIG. 1A is a three-dimensional exploded schematic diagram of the optical connector in the present invention, and FIG. 1B is a schematic diagram of the optical connector assembly in the present invention. In this embodiment, the optical connector 2 is an SN optical connector, but it is not limited thereto. The optical connector 2 is used to insert into the optical receptacle, and includes an outer housing 20, a coupling module 21 and a latch structure 22. In this embodiment, an insertion hole 200 is disposed on one side of the outer housing 20 for inserting the coupling module 21 into the outer housing 20. The outer housing 20 further has a unbuckle portion 201 disposed on the upper side of one end of the outer housing 20, and its application would be described later. The outer housing 20 further has first buckle grooves 202 on the upper and lower sides of the insertion hole 200 for buckling with the coupling module 21.

The coupling module 21 is disposed in the outer housing 20 and slidably connected to the outer housing 20. In this embodiment, the coupling module 21 further has a terminal module 210, a guiding structure 211, and a boot structure 212. The terminal module 210 is slidably connected to the outer housing 20 for coupling with a base (not shown) of the optical connector. In this embodiment, the terminal module 210 further has a terminal base 210a and a pair of terminal portions 210b. In this embodiment, the terminal base 210a is slidably disposed in the outer housing 20, and a partition plate 2100 is disposed at the center of the terminal base 210a to divide the terminal base 210a into two regions to respectively accommodate the terminal portions 210b. At the front end of the terminal base 210a, the two sides of the partition plate 2100 respectively have through holes 2101, and the upper and lower sides of the through holes 2101 respectively have buckle portions 2102. The upper and lower sides of the end of the partition plate 2100 have second buckle grooves 2103 respectively. The buckle portions 2102 are respectively exposed from the openings 203 on the upper and lower sides of the outer housing 20, and their functions would be described later. The terminal portion 210b further has a terminal 2105 and an elastic element 2104, wherein the terminal 2105 passes through the through hole 2101 at the front end of the terminal base 210a. One end of the elastic element 2104 is leaned against the end of the terminal 2105, and another end of the elastic element 2104 is leaned against the front end surface 2110 of the guiding structure 211. The elastic element 2104 is used to provide an elastic force to the terminal 2105 for adjusting the position of the terminal 2105. In addition, there are escape grooves 204 at the upper and lower ends of the insertion hole 200 of the outer housing 20, the function of escape grooves would be described later.

The guiding structure 211 is connected to the terminal module 210. In this embodiment, the guiding structure 211 further has a first positioning structure 2111 formed on the upper and lower sides of the guiding structure 211, respectively. When the coupling module 21 is installed on the outer housing 20, the positioning structure 2111 is combined with the first buckle groove 202 to generate a positioning effect. In this embodiment, the first positioning structure 2111 has an embedding space 2114 on the side of the front end surface 2110 for embedding the first fastener 2212 of the latch structure 22, and its operation method would be described later. At the end of the guiding structure 211, an extending shaft 2112, on which the latch structure 22 is sleeved, is protruded, and the extending shaft 2112 further penetrates into the second wire through hole 2120 of the boot structure 212. In this embodiment, the extending shaft 2112 has a first wire through hole 2115, which allows a communication wire (not shown) coupled with the terminal 2105 to pass through. The upper and lower sides of the front end surface 2110 of the guiding structure 211 further have second positioning structures 2113 for combining with the second buckle groove 2103 during assembly, so that the guiding structure 211 can be combined with the terminal base 210a. The boot structure 212 is rotatably combined with the extending shaft 2112 through the second wire through hole 2120, so that the latch structure 22 is pressed and fixed on the extending shaft 2112 by the boot structure 212. In this embodiment, a shaft sleeve 23 is further disposed between the boot structure 212 and the extending shaft 2112 to reduce the resistance between the boot structure 212 and the extending shaft 2112. It should be noted that the shaft sleeve 23 is not a necessary component in the present invention, and the user is able to decide depending on the needs.

In this embodiment, the latch structure 22 has a connecting member 220, and two sides of the latch structure 22 respectively have a fastening portion 221. Each fastening portion 221 further has a first extending rod 2210 and a second extending rod 2211. One end of the first extending rod 2210 has a first fastener 2212, and one end of the second extending rod 2211 has a second fastener 2213. The second extending rod 2211 extends to the boot structure 212 so that the second fastener 2213 is combined with the coupling structure 2121 on one side of the boot structure 212. In this embodiment, the coupling structure 2121 is a trough structure, so that the second fastener 2213 can be embedded into it to generate a coupling effect.

Since the boot structure 212 may be rotatably combined with the extending shaft 2112, and the latch structure 22 may also be rotatably sleeved on the extending shaft 2112, and can be combined with the boot structure 212 through the second fastener 2213. The boot structure 212 takes the extending shaft 2112 as a rotation axis, and rotates on the extending shaft 2112 to change the position of the latch structure 22. The latch structure 22 in this embodiment has three functions. The first function is to lock the optical connector into the optical receptacle. In this state, the optical connector cannot be pulled out by the external force. The second function is to release the locking relationship between the optical connector and the optical receptacle, so that the optical connector can be taken away from the optical receptacle. The third function is to change the polarity of the coupling module of the optical connector.

Figure 2A:
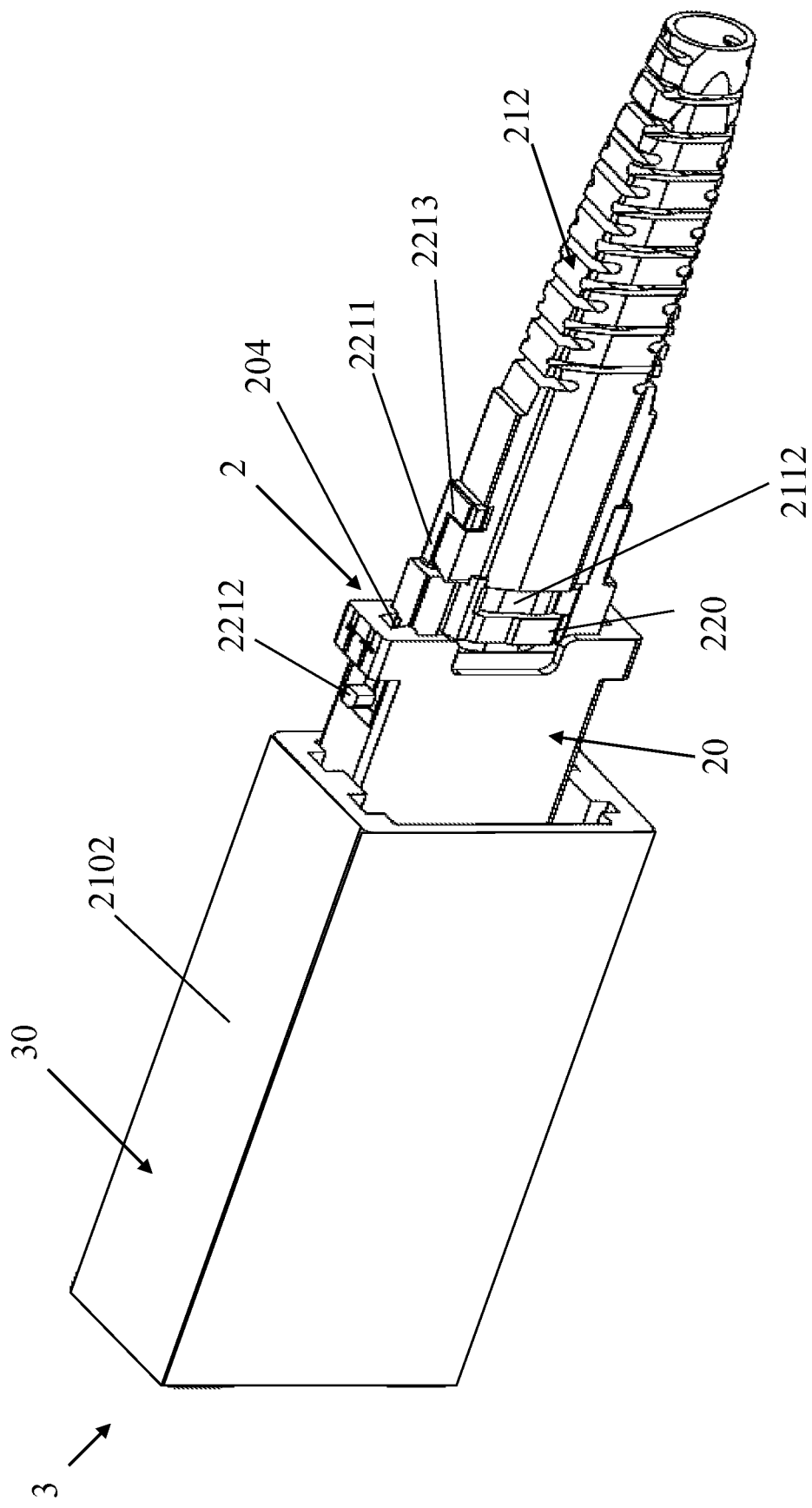
FIG. 2A is a schematic diagram of the three-dimensional assembly of the optical connector module in the present invention.
Figure 2B:
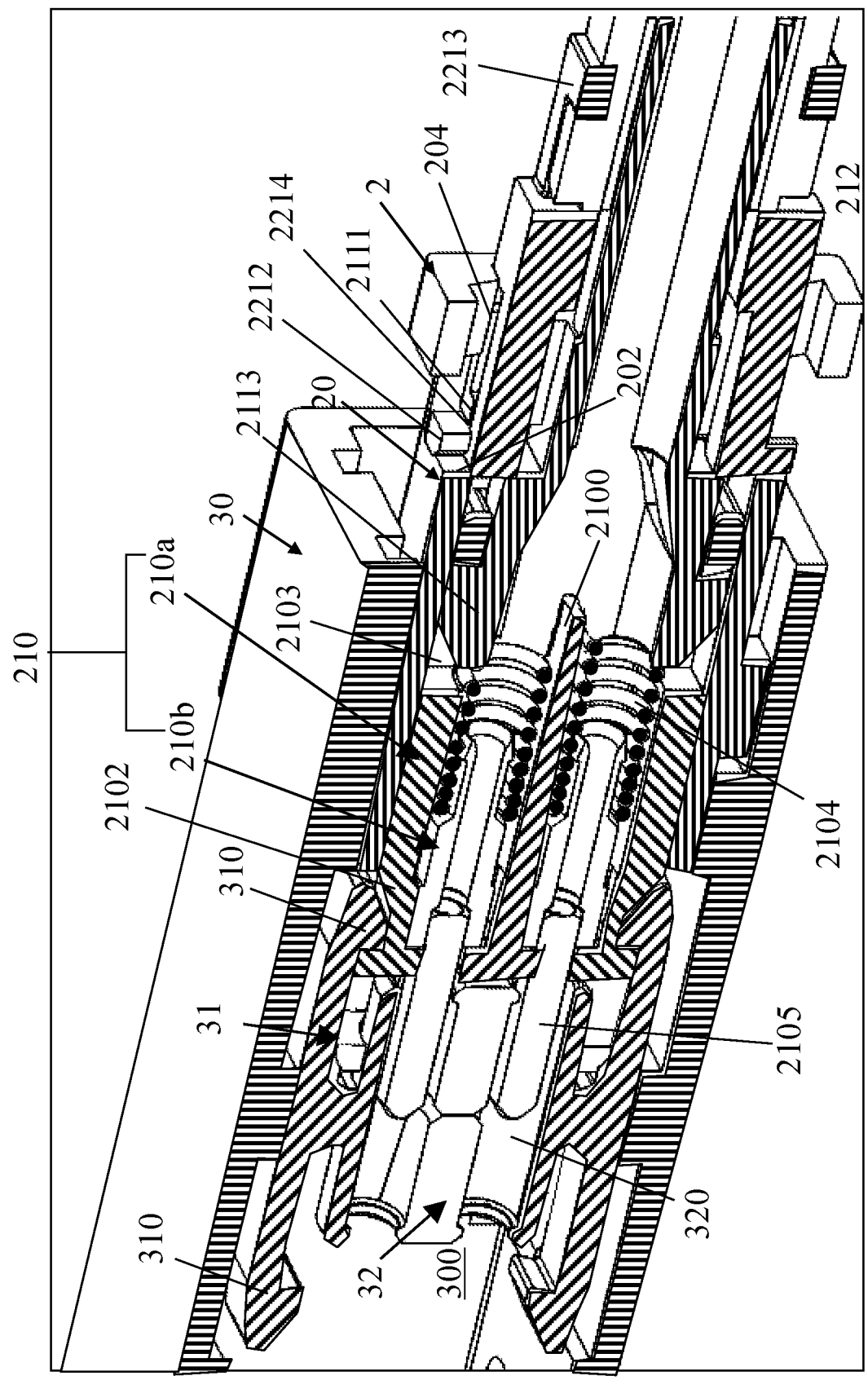
FIG. 2B is a schematic cross-sectional diagram of the optical connector module in the present invention.

Next, how to achieve the above three effects is going to be explained. Please refer to FIGS. 2A and 2B, where FIG. 2A is a schematic diagram of the three-dimensional assembly of the optical connector module in the present invention, and FIG. 2B is a schematic cross-sectional diagram of the optical connector module in the present invention. In this embodiment, the optical connector module 3 includes an optical receptacle 30 and an optical connector 2. The optical receptacle 30 has an accommodating space 300, and a claw portion 31 and an electrical connection base 32 are accommodated inside the accommodating space 300. In this embodiment, one end of the electrical connection base 32 is electrically connected to the optical connector 2, wherein the electrical connection base 32 has an electrical connection through hole 320, which is allowed the terminal 2105 of the optical connector 2 to pass through. The claw portions 31 are respectively arranged on both sides of the electrical connection base 32, and both ends of the claw portions 31 are respectively have claw members 310. When the optical connector 2 is inserted into the optical receptacle 30. The claw members 310 are buckled with the buckle portion 2102 on the terminal base 210a of the terminal module 210 of the optical connector 2.

Figure 2D:
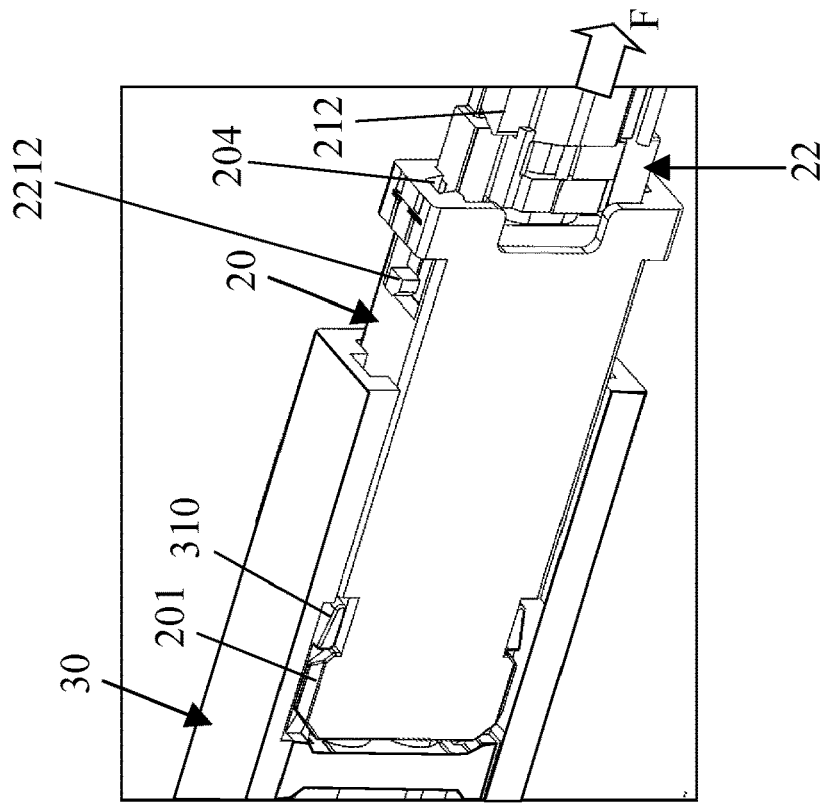
FIG. 2D is a schematic diagram of the optical connector having the outer housing.
Figure 2C:
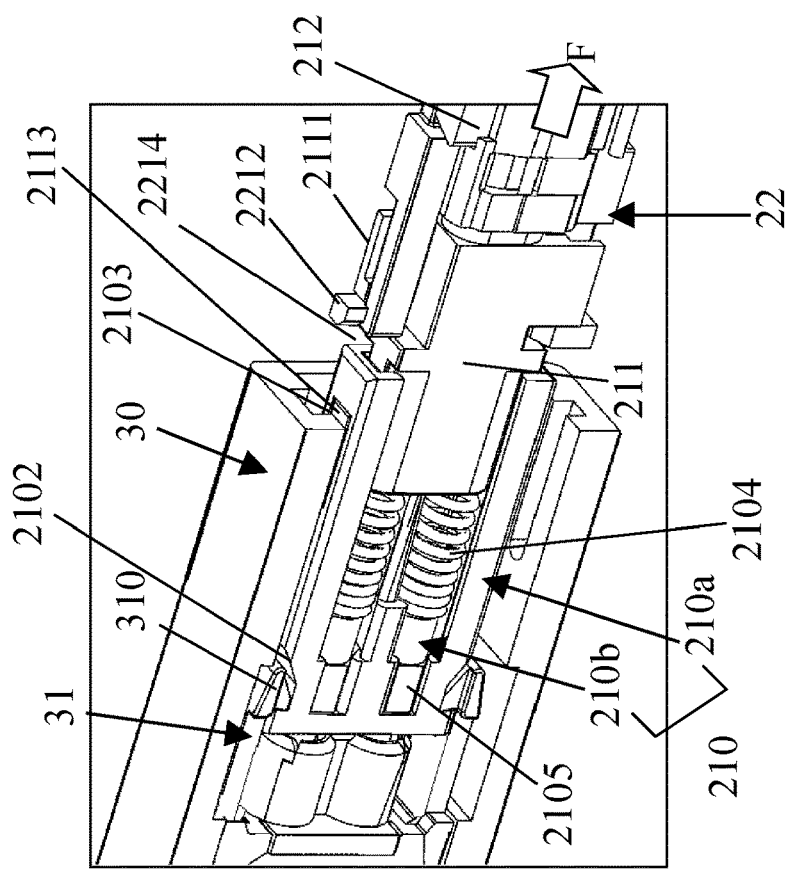
FIG. 2C is a schematic diagram of the optical connector with removing the outer housing.

After the optical connector 2 is inserted into the optical receptacle 30, the boot structure 212 is rotated so that the latch structure 22 is located at the first position, that is, the first fastener 2212 of the latch structure 22 is embedded into the embedding space 2114 to make the optical connector 2 firmly locked in the optical receptacle 30 and cannot be pulled out by the external force. The following describes the locking mechanism, please refer to FIGS. 2C and 2D, which are partial cross-sectional schematic diagrams when the optical connector 2 is combined with the optical receptacle 30, wherein FIG. 2C is a schematic diagram of the optical connector with removing the outer housing, and FIG. 2D is a schematic diagram of the optical connector having the outer housing. Since the boot structure 212 is combined with the terminal module 210 by the latch structure 22, when the boot structure 212 is pulled by the external force F, the external force F is delivered to the terminal module 210 through the latch structure 22.

In this embodiment, the first fastener 2212 of the latch structure 22 is embedded into the embedding space 2114 at the front end of the first positioning structure 2111. Therefore, when the external force F is delivered to the latch structure 22, the first fastener 2212 of the latch structure 22 is leaned against the first positioning structure 2111, so that the external force is delivered to the guiding structure 211 having the first positioning structure 2111. Moreover, the guiding structure 211 is embedded into the second buckle groove 2103 by the second positioning structure 2113, so the external force is delivered to the terminal base 210a having the second buckle groove 2103. Also, since the buckle portion 2102 at the front end of the terminal base 210a is locked by the claw member 310, the optical connector 2 cannot be pulled out from the optical receptacle 30 even if the external force F is applied. In addition, it should be noted that, in the aforementioned state of FIG. 2C and FIG. 2D, although the outer housing 20 of the optical connector 2 has a unbuckle portion 201, when it is pulled by the external force F, the latch structure 22 is embedded into the embedding space 2114 of the first position, so that the external force F is not able to deliver the force to the outer housing 20. As a result, the outer housing 20 cannot be affected by the external force F and cannot generate a displacement movement to release the claw member 310. Therefore, when the first fastener 2212 of the latch structure 22 is leaned against the first positioning structure 2111, a fixing effect of locking the optical connector 2 in the optical receptacle 30 may be generated.

Figure 3A:
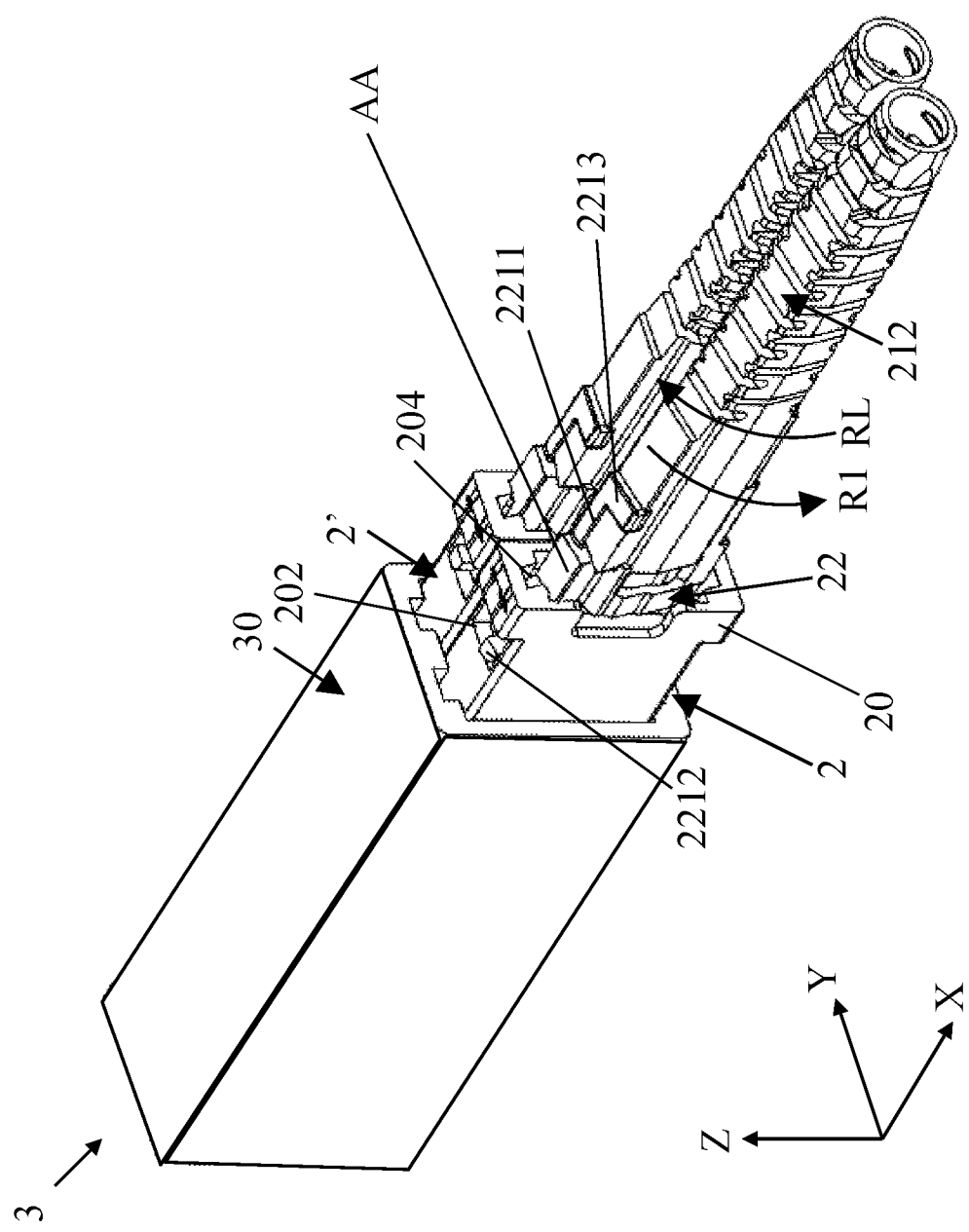
FIGS. 3A to 3C are schematic diagrams of the optical connector in an unlocked state in the present invention.
Figure 3B:
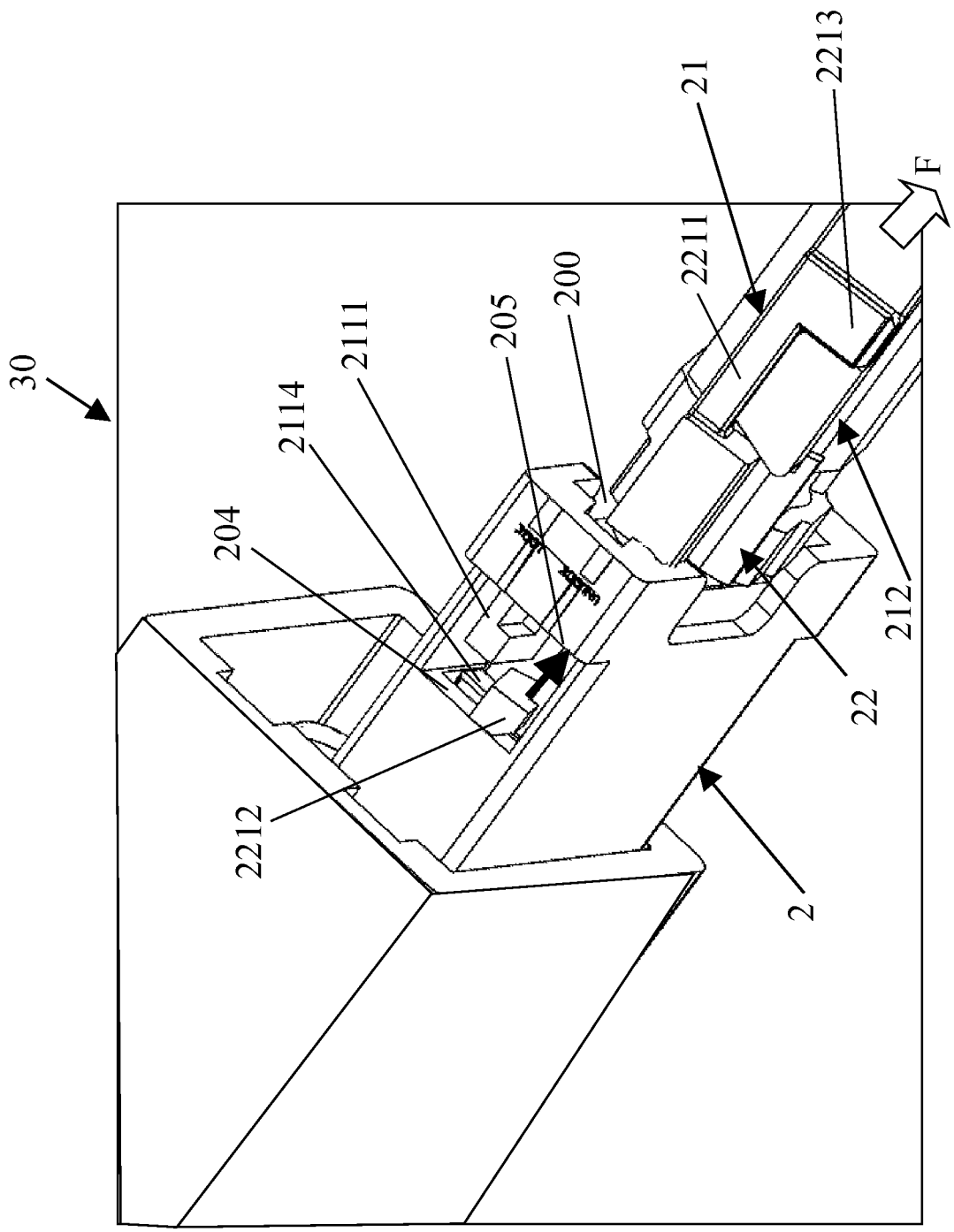
Figure 3C:
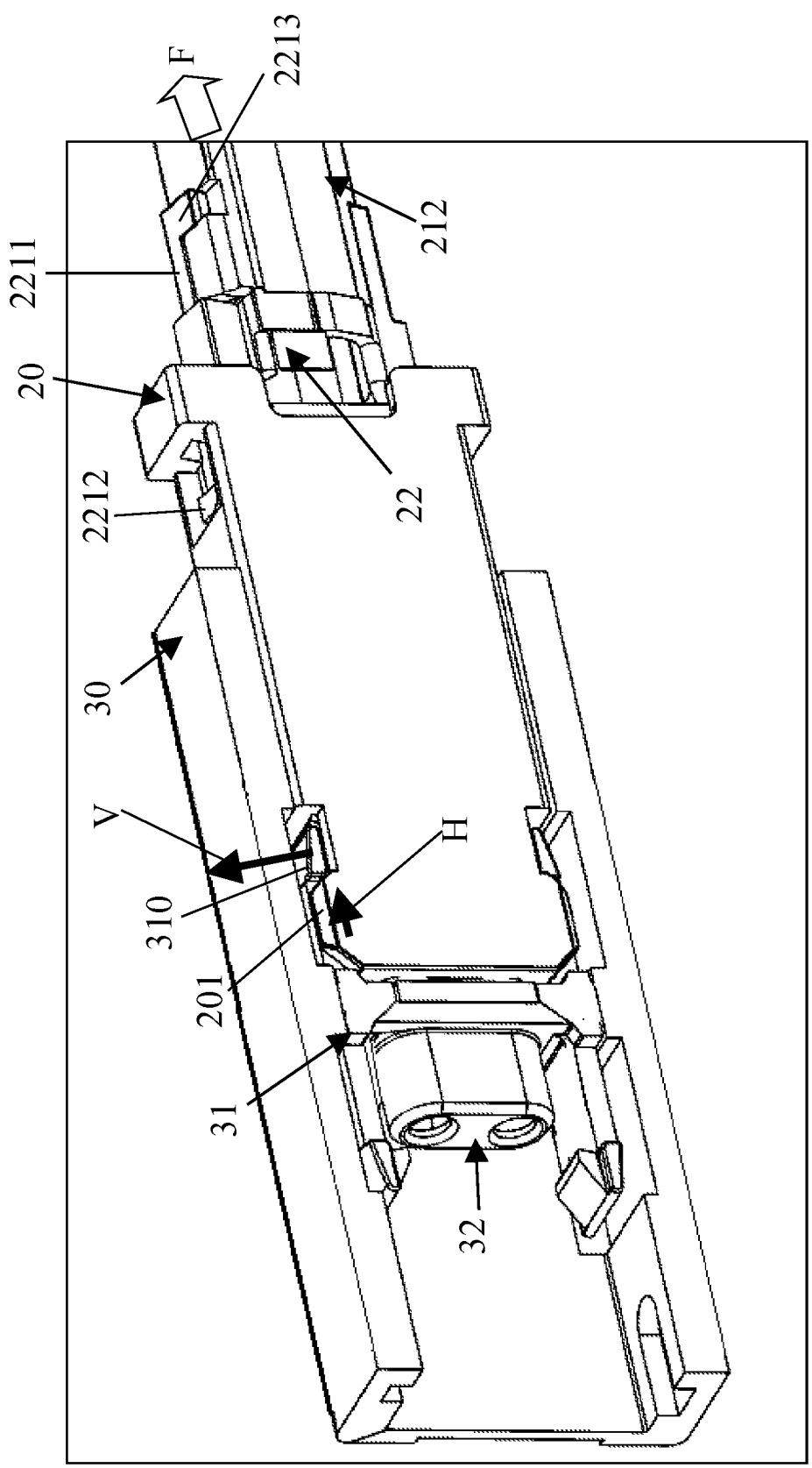

Please refer to FIGS. 3A to 3C, which are schematic diagrams of the optical connector in the present invention in an unlocked state. In FIG. 3A, the optical connector 30 has two optical connectors 2 and 2', wherein the optical connector 2' is in the locked state, and the optical connector 2 is in the unlocked state. The optical connectors 2 and 2' are used to compare with each other. When the user needs to unplug the optical connector 2 from the optical receptacle 30, as shown in FIG. 3A, the user may perform the optical connector 2 in a first rotating movement R1 by a predetermined angle, so that the first fastener 2212 is separated from the embedded space 2114 to move to the second position, the first rotating movement in this embodiment is that the user uses the boot structure 212 to rotate counterclockwise. As shown in FIG. 3B, it can be clearly seen that the first fastener 2212 is separated from the embedding space 2114. In this state, if the user applies an external force F, which direction is opposite to the insertion direction of the optical connector 2 into the optical receptacle 30, to the boot structure 212, then the external force F is delivered to the latch structure 22 through the boot structure 212. Since the latch structure 22 is no longer restrained by the first positioning structure 2111, the boot structure 212 is also not restrained by the first positioning structure 2111. Therefore, after receiving the external force F, the boot structure 212 moves in the direction of the external force F. At this time, the first fastener 2212 of the latch structure 22 moves in the direction of the external force F along with the boot structure 212, thereby being leaned against the abutment surface 205 on the side of the insertion hole 200 of the outer housing 20.

After the first fastener 2112 is leaned against the abutment surface 205, as the external force F continues to pull, the first fastener 2112 delivers the external force F to the outer housing 20. When the outer housing 20 receives the external force F, the outer housing 20 is also pulled in the direction of the external force F. Since the outer housing 20 is not restrained by the claw portion 31, when the outer housing 20 moves in the direction of the external force F, the unbuckle portion 201 on the outer housing 20 would also move a predetermined distance H along the direction of the external force F. When the unbuckle portion 201 is moved in a predetermined distance H, the claw portion 31 would be propped up in the direction V, and the claw portion 31 would be separated from the buckle portion 2102.

Figure 3D:
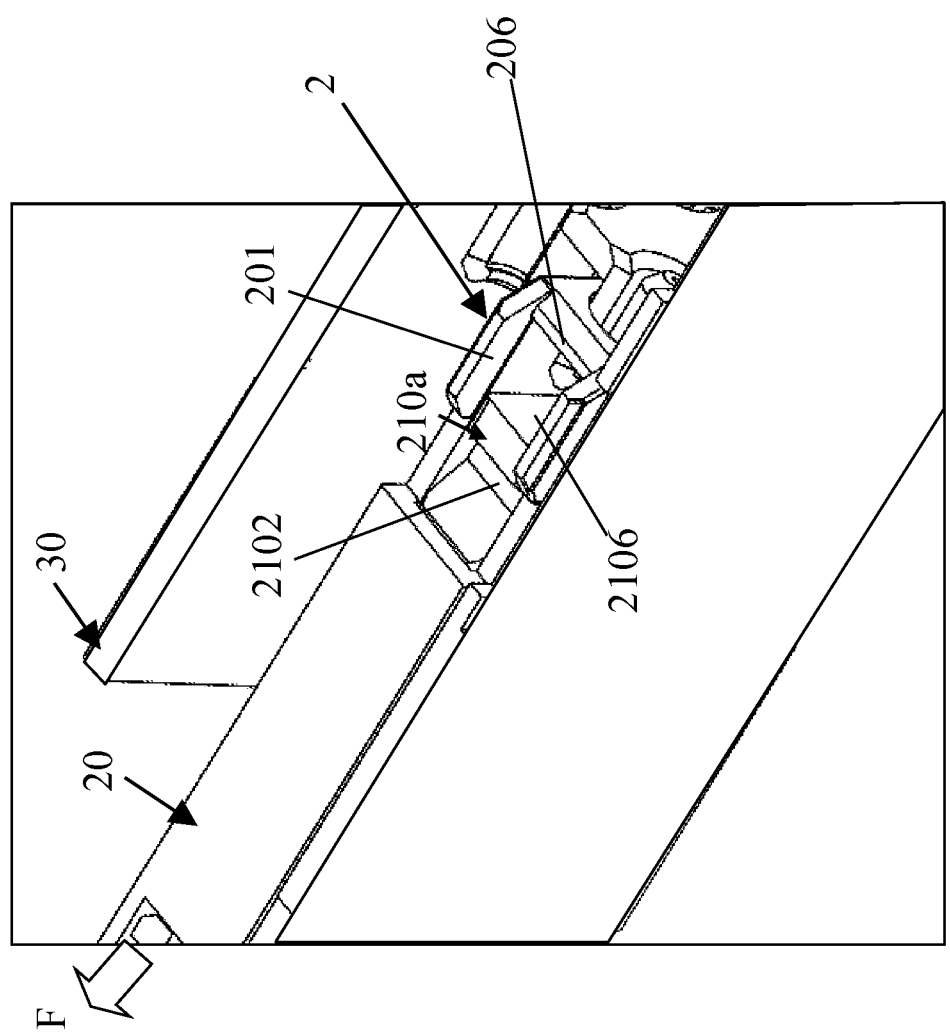
FIG. 3D is a schematic diagram of an embodiment of the optical connector taking away from the optical receptacle in the present invention.

Please refer to FIG. 3D, which is a schematic diagram of an embodiment of the optical connector taking away from the optical receptacle in the present invention. This embodiment mainly explains how to take the optical connector 2 away from the optical receptacle 30 after the outer housing 20 moves in the direction of the external force F. In this embodiment, after the outer housing 20 of the optical connector 2 is moved by the external force F, the end portion 206 of the outer housing 20 would be leaned against the surface 2106 of the terminal base 210a after moving a certain distance. As the external force F continues to be applied, the outer housing 20 pushes the terminal base 210a to move in the direction of the external force F, and the entire optical connector 2 is separated from the optical receptacle 30.

Figure 4B:
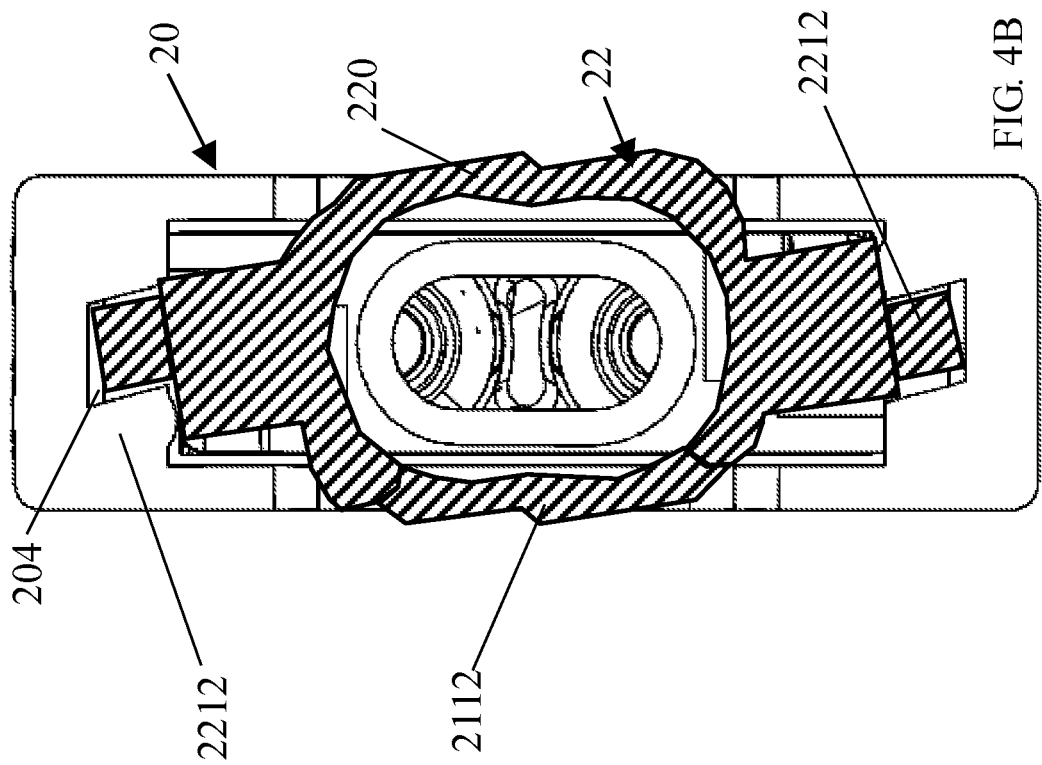
FIGS. 4A and 4B are schematic diagrams of the optical connector in the state of FIG. 3A, approximately at the position AA of the YZ cross-section in the present invention.
Figure 4A:
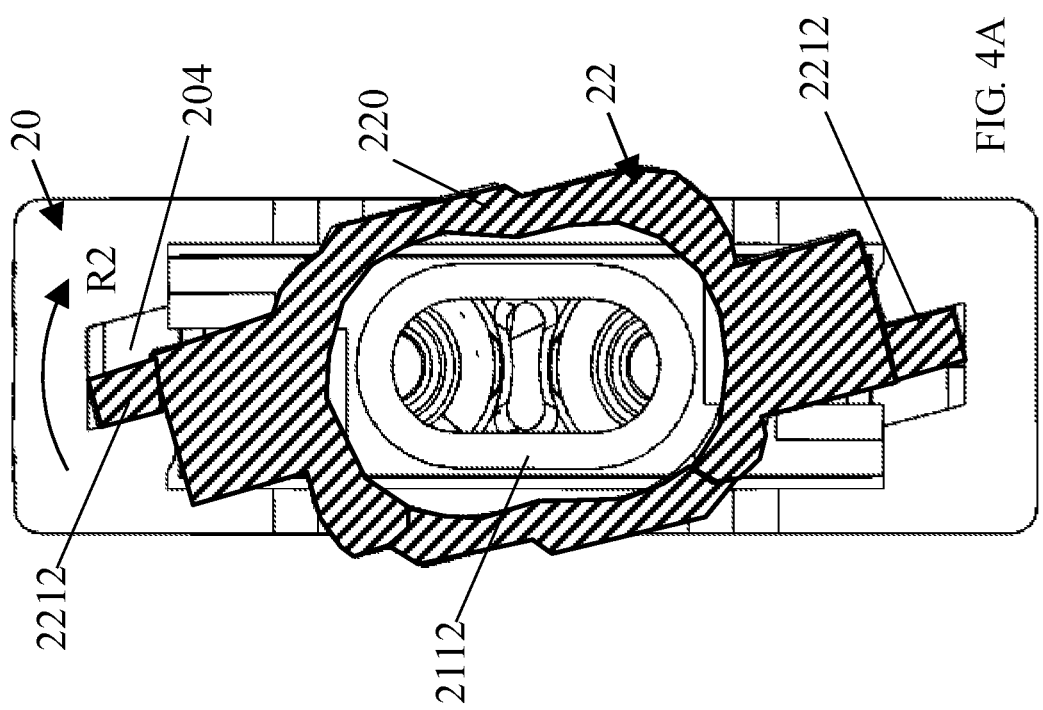
Figure 5A:
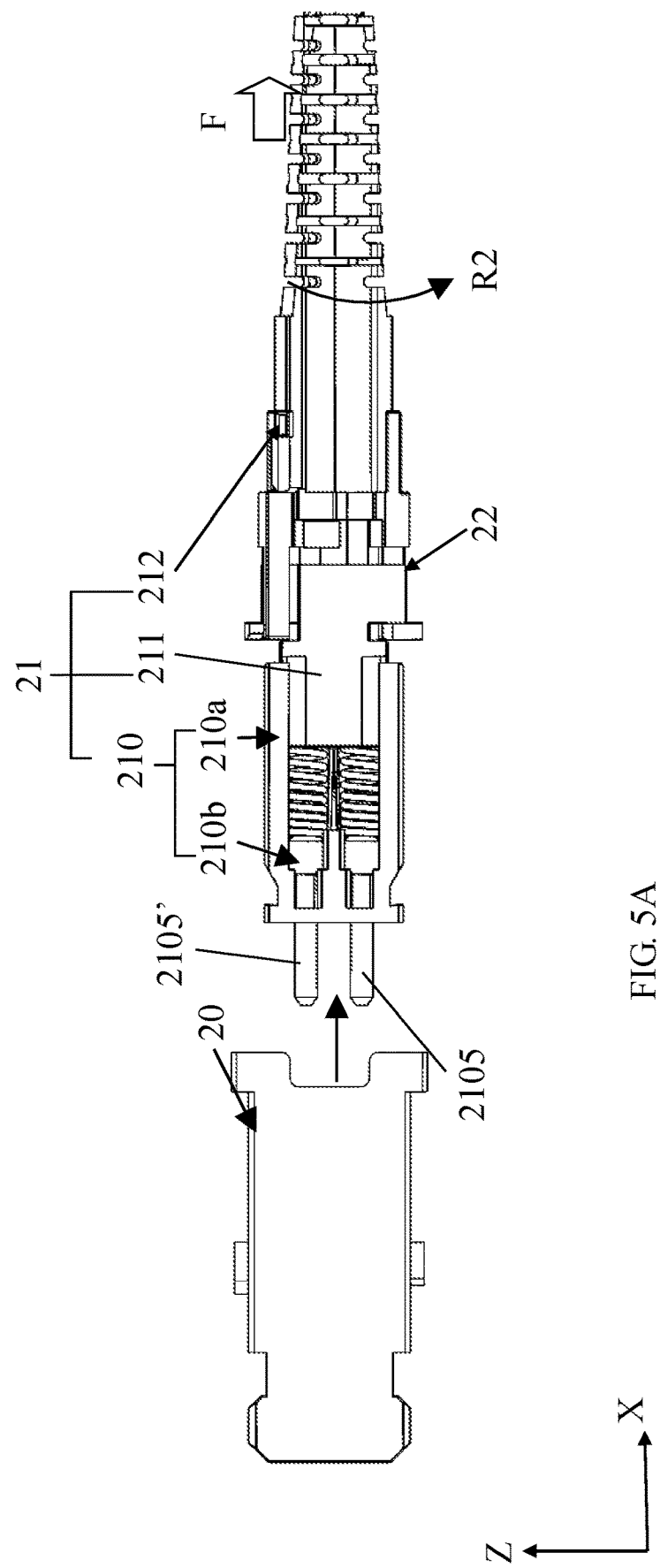
FIGS. 5A and 5B are schematic diagrams showing the polarity change of the optical connector in the present invention.

Next, the way of changing the polarity of the optical connector is going to be explained. In this embodiment, as shown in FIGS. 4A and 4B, which are YZ cross-sectional schematic diagram of the optical connector 2 in the state of FIG. 3A, approximately at the position AA. In the state of FIG. 4A, the latch structure 22 is rotated to the second position. It should be noted that when the latch structure 22 is rotated to the second position, the first fasteners 2212 at both ends of the latch structure 22 does not completely correspond to the escape groove 204, so that the user can pull the optical connector 2 out of the optical receptacle in this state. When the user wants to change the polarity, as shown in FIG. 4A, the latch structure 22 can be rotated clockwise to the third position. In the third position, the first fastener 2212 completely corresponds to the escape groove 204. In this state, as shown in FIGS. 4B and 5A, the user applies a pulling force F in the X direction to the boot structure 212. The boot structure 212 receives the pulling force F and delivers the force to the latch structure 22. Since the first fastener 2212 on the latch structure 22 corresponds to the escape groove 204 of the outer housing 20, after the external force F is driven, the latch structure 22 moves along the X direction and is separated from the outer housing 20.

Figure 5B:
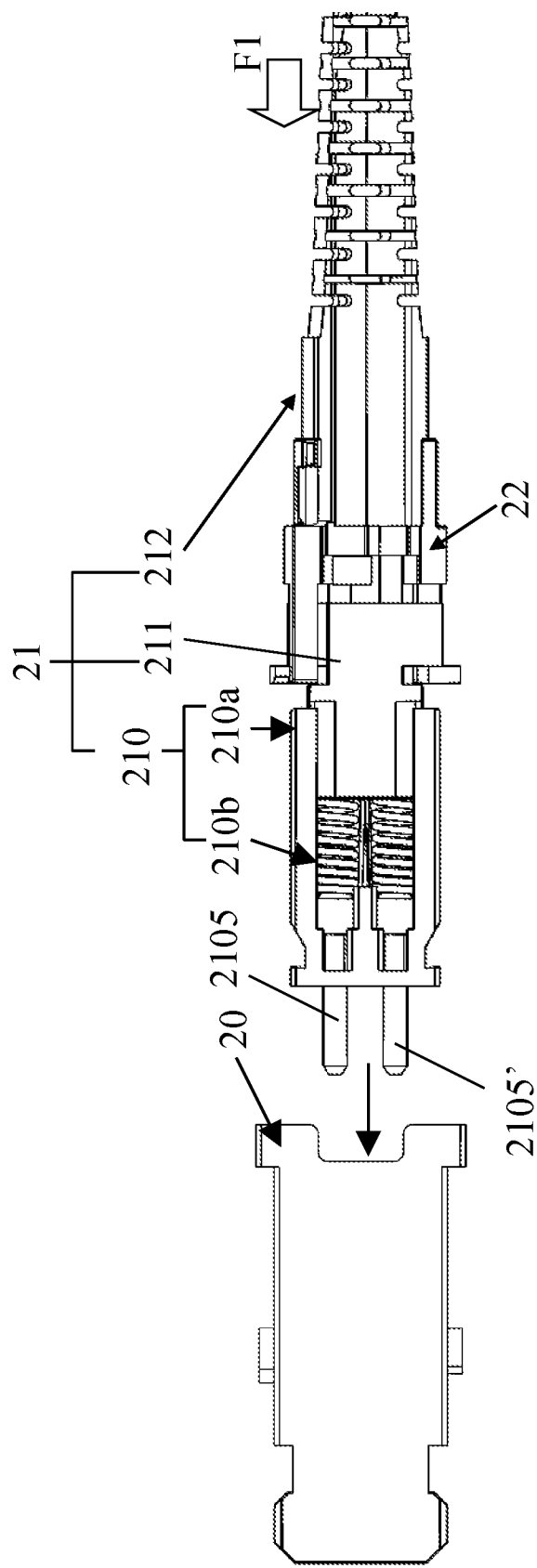

After separating from the outer housing 20, taking FIG. 5A as an example, the terminal 2105 is below and the terminal 2105' is above. When changing the polarity, the terminal module 21 is flipped completely, as shown in FIG. 5B, at this time the terminals 2105 and 2105' are upside down, and the pushing force F1 is applied to install the entire terminal module 21 into the housing 20, and then the latch structure 22 is turned away from the third position, for example: turn to the first position as shown in FIG. 1B or the second position as shown in FIG. 3B, to complete the polarity change of the optical connector 2.

Based on the foregoing embodiments of the optical connector and the optical receptacle, in another embodiment, the present invention further provides an operation method of the optical connector module, which includes the following steps. First, as shown the optical connector 2 in in FIGS. 1A and 1B, the optical connector module includes an outer housing 20, a coupling module 21, and a latch structure 22. As shown in FIGS. 2A to 2D, the optical connector 2 is inserted into the optical receptacle 30, so that the claw member 310 in the optical receptacle 30 is buckled with the coupling module 21 of the optical connector 2. After that, locking process is performed and the optical connector 2 may not be taken away from the optical receptacle 30. In this step, the latch structure 22 is moved to the first position (as shown in the optical connector 2' in FIG. 3A) by the rotating movement RL, so that the optical connector may not be taken away from the optical receptacle. When unlocking, the latch structure 22 is moved to the second position by the first rotating movement R1 (as shown in FIG. 3B). At this time, the outer housing 20 is slid relative to the coupling module 21 under an external force F. The unbuckle portion 201 of the outer housing 20 is moved with the external force, and the claw member 310 is released from the coupling module 21, and then the optical connector 2 is taken away from the optical receptacle 30 (as shown in FIG. 3C). If the polarity is to be changed, the coupling module 21 is separated from the outer housing 20 by the second rotating movement R2 (as shown in FIGS. 5A and 5B). In this embodiment, the first rotating movement is clockwise, the second rotating movement is counterclockwise, and the third rotating movement is clockwise. It should be noted that, according to the purpose of the present invention, the rotating direction can be determined according to the mechanical design, and is not limited by the rotating direction of this embodiment.

In summary, the optical connector of the present invention has a latch structure that may be positioned at different positions, and the unlocking or locking state between the optical connector and the optical receptacle may be changed according to the position of the latch structure. The advantage of the present invention is to avoid the optical connector from being pulled off by the external force accidentally or intentionally, and achieve the effect of fixing the optical connector.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. An optical connector for coupling to an optical receptacle, comprising:
   an outer housing;
   a coupling module, slidably connected to the outer housing; and
   a latch structure, rotatably connected to the coupling module, wherein a position of the latch structure is changed by a rotating movement to allow the optical connector to be locked in the optical receptacle, or allow the optical connector to be taken away under an external force, wherein the coupling module comprises:
- a terminal module, slidably connected to the outer housing, and configured for coupling to the optical receptacle;
- a guiding structure, connected to the terminal module and having an extending shaft; and
- a boot structure, rotatably connected to the extending shaft, wherein when the latch structure is rotated to a first position by the rotating movement, the guiding structure and the outer housing are moved under the external force; when the latch structure is rotated to a second position by the rotating movement, the outer housing is moved relative to the terminal module under the external force.

2. The optical connector of claim 1, wherein when the latch structure is rotated to the first position, the optical connector is unable to be taken away from the optical receptacle; or when the latch structure is rotated to the second position, the optical connector is taken away from the optical receptacle.

3. The optical connector of claim 2, wherein the latch structure comprises:
- a first fastener, wherein when the first fastener is located at the first position, the first fastener is buckled between the guiding structure and the outer housing to make the outer housing not move relative to the terminal module; when the first fastener is located at the second position, the first fastener is separated from a position between the guiding structure and the outer housing to cause the outer housing move relative to the terminal module under the external force;
- a connecting member, connected to the first fastener; and
- a second fastener, connected to the connecting member, the first fastener and the second fastener located at two ends of the connecting member, and the second fastener connected to the boot structure.

4. The optical connector of claim 3, wherein the outer housing has an escape groove, the latch structure rotates the first fastener to a position corresponding to the escape groove by the rotating movement, so that the coupling module is separated from the outer housing.

5. An optical connector module, comprising:
an optical receptacle, having a claw member; and
an optical connector, coupled to the optical receptacle, and buckled with the claw member, the optical connector including an outer housing, a coupling module, and a latch structure, a unbuckle portion of the outer housing located in the claw member, the coupling module slidably connected to the outer housing, and the claw member buckled on the coupling module, and the latch structure rotatably connected to the coupling module, wherein a position the latch structure is changed by a rotating movement to allow the optical connector to lock in the optical receptacle or to be taken away from the optical receptacle by an external force,
wherein the coupling module comprises:
- a terminal module, slidably connected to the outer housing, and configured for coupling to the optical receptacle;
- a guiding structure, connected to the terminal module and having an extending shaft; and
- a boot structure, rotatably connected to the extending shaft, wherein when the latch structure is rotated to a first position by the rotating movement, the guiding structure and the outer housing are moved under the external force; when the latch structure is rotated to a second position by the rotating movement, the outer housing is moved relative to the terminal module under the external force.

6. The optical connector module of claim 5, wherein when the latch structure is rotated to the first position, the outer housing and the coupling module are moved together, and the optical connector is unable to be taken away from the optical receptacle; so that the optical connector is unable to take away from the optical receptacle; and when the latch structure is rotated to the second position, the outer housing is moved relative to the coupling module by an external force, so that the unbuckle portion of the outer housing is moved with the external force, thereby releasing the claw member from the coupling module and making the optical connector taken away from the optical receptacle.

7. The optical connector module of claim 5, wherein the latch structure comprises:
- a first fastener, wherein when the first fastener is located at the first position, the first fastener is buckled between the guiding structure and the outer housing to make the outer housing and the coupling module move together; when the first fastener is located at the second position, the first fastener is separated from a position between the guiding structure and the outer housing to cause the outer housing move relative to the terminal module under the external force;
- a connecting member, connected to the first fastener; and
- a second fastener, connected to the connecting member, the first fastener and the second fastener located at two ends of the connecting member, and the second fastener connected to the boot structure.

8. The optical connector module of claim 5, wherein the outer housing has an escape groove, the latch structure rotates the first fastener to a position corresponding to the escape groove by the rotating movement, so that the coupling module is separated from the outer housing.

9. An operation method of an optical connector module, comprising:
providing an optical connector, including an outer housing, a coupling module, and a latch structure;
inserting an optical connector into an optical receptacle to make a claw member, which is disposed in the optical receptacle, buckle with the coupling module of the optical connector;
moving the latch structure to a first position by a first rotating movement to make the optical connector not taken away from the optical receptacle; and
moving the latch structure to a second position by a second rotating movement, sliding the outer housing relative to the coupling module under an external force to make a unbuckle portion of the outer housing move with the external force, thereby releasing the claw member from the coupling module and taking the optical connector away from the optical receptacle.

10. The operation method of claim 9, comprising separating the coupling module with the outer housing by a third rotating movement.

11. The operation method of claim 10, wherein the first rotating movement and the second rotating movement are in an opposite direction, and the second rotating movement and the third rotating movement are in an identical direction.

* * * * *